(12) United States Patent
Ichimura

(10) Patent No.: US 11,318,912 B2
(45) Date of Patent: *May 3, 2022

(54) MONITORING SYSTEM, MONITORING CENTER DEVICE, MOUNTING DEVICE, MONITORING METHOD, PROCESSING METHOD, AND PROGRAM

(71) Applicant: NEC Corporation, Tokyo (JP)

(72) Inventor: Akiyoshi Ichimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/005,912

(22) Filed: Aug. 28, 2020

(65) Prior Publication Data

US 2020/0384954 A1 Dec. 10, 2020

Related U.S. Application Data

(63) Continuation of application No. 15/849,951, filed on Dec. 21, 2017, now abandoned.

(30) Foreign Application Priority Data

Jan. 27, 2017 (JP) .............................. JP2017-012731

(51) Int. Cl.
*B60R 25/00* (2013.01)
*B60R 25/10* (2013.01)
(Continued)

(52) U.S. Cl.
CPC .......... *B60R 25/305* (2013.01); *B60R 25/102* (2013.01); *B60R 25/25* (2013.01); *B60R 25/302* (2013.01); *B60R 25/31* (2013.01)

(58) Field of Classification Search
CPC .......... B60R 25/10; B60R 25/25; G06K 9/00; G06K 9/00832
See application file for complete search history.

(56) References Cited

U.S. PATENT DOCUMENTS 9,235,750 B1 * 1/2016 Sutton ..................... B60R 25/01
9,870,706 B2 * 1/2018 Aiderman .............. G08B 21/22
(Continued)

FOREIGN PATENT DOCUMENTS

JP 2002-304686 A 10/2002
JP 2004-314906 A 11/2004
(Continued)

OTHER PUBLICATIONS

Real-time vehicle security system through face recognition; 2014. (Year: 2014).*

(Continued)

*Primary Examiner* — Luis Perez-Fuentes
(74) *Attorney, Agent, or Firm* — Sughrue Mion, PLLC

(57) ABSTRACT

A monitoring system in which a mounting device of a moving body and a monitoring center device are connected via a communication network, wherein the mounting device includes a photographing unit configured to photograph a passenger, and a feature transmission unit configured to transmit feature data of the passenger, and the monitoring center device includes a monitoring processing unit which determines whether the feature data is recorded in a database and performs monitoring processing on the basis of a result of the determination.

18 Claims, 5 Drawing Sheets

(51) Int. Cl.
  *B60R 25/30* (2013.01)
  *B60R 25/31* (2013.01)
  *B60R 25/102* (2013.01)
  *B60R 25/25* (2013.01)

(56) References Cited

U.S. PATENT DOCUMENTS

| | | | |
|---|---|---|---|
| 2001/0056544 A1* | 12/2001 | Walker | B60T 7/18 |
| | | | 726/2 |
| 2002/0097145 A1 | 7/2002 | Tumey et al. | |
| 2004/0257208 A1 | 12/2004 | Huang et al. | |
| 2005/0062602 A1* | 3/2005 | Fujiwara | B60R 25/102 |
| | | | 340/539.1 |
| 2006/0238300 A1 | 10/2006 | Ohtaki et al. | |
| 2008/0297330 A1* | 12/2008 | Jeon | G06K 9/00221 |
| | | | 340/426.11 |
| 2014/0162598 A1 | 6/2014 | Villa-Real | |
| 2016/0132673 A1* | 5/2016 | Birk | G06F 21/30 |
| | | | 726/19 |
| 2017/0001598 A1* | 1/2017 | Pophale | B60R 25/24 |
| 2018/0072270 A1* | 3/2018 | Renaud | B60R 25/305 |
| 2018/0126950 A1* | 5/2018 | Aiderman | B60R 25/24 |
| 2018/0211543 A1* | 7/2018 | Wei | G06Q 10/0833 |

FOREIGN PATENT DOCUMENTS

| | | |
|---|---|---|
| JP | 2006-298324 A | 11/2006 |
| JP | 2009-059259 A | 3/2009 |
| JP | 2014-232421 A | 12/2014 |
| JP | 2016-186813 A | 10/2016 |

OTHER PUBLICATIONS

Automatic detection of vehicle occupants—the imaging problems and solution; 2000. (Year: 2000).*
Japanese Office Action for JP Application No. 2017-012731 dated Feb. 13, 2018 with English Translation.
Japanese Office Action for JP Application No. 2017-012731 dated Aug. 14, 2018 with English Translation.
U.S. NOA and PTO-892 for U.S. Appl. No. 16/351,685 mailed on Dec. 3, 2019.
Power Management IC, Guide for Automotive industry; 2014 (Year: 2014).

* cited by examiner

MONITORING SYSTEM, MONITORING CENTER DEVICE, MOUNTING DEVICE, MONITORING METHOD, PROCESSING METHOD, AND PROGRAM

INCORPORATION BY REFERENCE

The present application is a Continuation application of Ser. No. 15/849,951 filed on Dec. 21, 2017, which is based upon and claims the benefit of priority from Japanese patent application No. 2017-012731 filed on Jan. 27, 2017, the disclosure of which is incorporated herein in its entirety by reference.

TECHNICAL FIELD

The present invention relates to a monitoring system, a monitoring center device, a mounting device, a monitoring method, a processing method, and a program.

BACKGROUND ART

A technology aimed at preventing crime using vehicles has been studied. For example, Japanese Unexamined Patent Application, First Publication No. 2016-186813 discloses a technology capable of preventing theft of vehicles such as automobiles and exerting power in arresting a criminal or catching a criminal.

SUMMARY

It is necessary to detect not only theft but various types of crimes in moving bodies such as various vehicles and to prevent crimes.

An example object of the present invention is to provide a monitoring system, a monitoring center device, a mounting device, a monitoring method, a processing method, and a program which can solve the above problems.

According to a first example aspect of the present invention, in a monitoring system comprising a mounting device of a moving body and a monitoring center device connected to the mounting device via a communication network, the mounting device includes a photographing unit configured to photograph a passenger, and a feature transmission unit configured to transmit feature data of the passenger, and the monitoring center device includes a monitoring processing unit which determines whether the feature data is recorded in a database and performs monitoring processing on the basis of a result of the determination.

According to a second example aspect of the present invention, a monitoring center device in a monitoring system in which a mounting device of a moving body including a photographing unit for photographing a passenger and a feature transmission unit for transmitting feature data of the passenger, and the monitoring center device are connected via a communication network includes a monitoring processing unit which determines whether the feature data is recorded in a database and performs monitoring processing on the basis of a result of the determination.

According to a third example aspect of the present invention, a mounting device in a monitoring system in which the mounting device of a moving body and a monitoring center device are connected via a communication network includes a photographing unit configured to photograph a passenger, a feature transmission unit configured to transmit feature data of the passenger to the monitoring center device, and a start control unit configured to acquire, from the monitoring center device which performs monitoring processing on the basis of a result of determining whether the feature data is recorded in a database, a result of the determination and to control starting of a moving body on which the mounting device is mounted on the basis of the result of the determination.

According to a fourth example aspect of the present invention, a monitoring method includes determining whether the feature data is recorded in a database and performing monitoring processing on the basis of a result of the determination, by a monitoring center device in a monitoring system in which a mounting device of a moving body including a photographing unit for photographing a passenger and a feature transmission unit for transmitting feature data of the passenger, and the monitoring center device are connected via a communication network.

According to a fifth example aspect of the present invention, a processing method includes photographing a passenger, transmitting feature data of the passenger to the monitoring center device, acquiring, from the monitoring center device performing monitoring processing on the basis of a result of determining whether the feature data is recorded in a database, the result of the determination, and controlling starting of a moving body on which the mounting device is mounted on the basis of the result of the determination, by a mounting device in a monitoring system in which the mounting device of a moving body and a monitoring center device are connected via a communication network.

According to a sixth example aspect of the present invention, a non-transitory computer-readable recording medium storing a program which causes a computer to perform processes of a monitoring center device in a monitoring system in which a mounting device of a moving body including a photographing unit for photographing a passenger and a feature transmission unit for transmitting feature data of the passenger and a monitoring center device are connected via a communication network, the processes comprising determining whether or not the feature data is recorded in a database and to perform monitoring processing on the basis of a result of the determination.

According to a seventh example aspect of the present invention, a non-transitory computer-readable recording medium storing a program which causes a computer to perform processes of a mounting device in a monitoring system in which the mounting device of a moving body and a monitoring center device are connected via a communication network, the processes comprising photographing a passenger, transmitting feature data of the passenger to the monitoring center device, and acquiring, from the monitoring center device performing monitoring processing on the basis of a result of determining whether the feature data is recorded in a database, a result of the determination and controlling starting of a moving body on which the mounting device is mounted on the basis of the result of the determination.

EXAMPLE EMBODIMENT

Hereinafter, a monitoring system, a monitoring center device, a mounting device, a monitoring method, a processing method, and a program according to one embodiment of the present invention will be described with reference to drawings.

Figure 1:
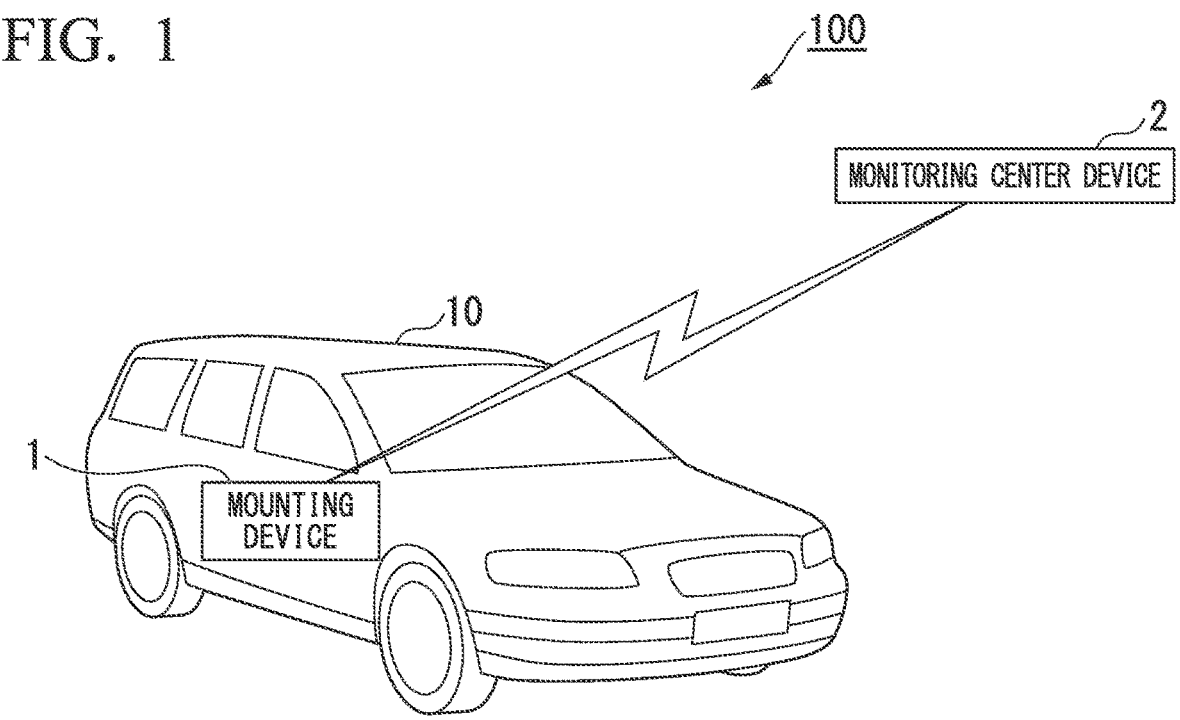
FIG. 1 is a schematic diagram of a monitoring system according to one embodiment of the present invention.

FIG. 1 is a schematic diagram of a monitoring system according to the embodiment.

In a monitoring system 100 as shown in FIG. 1, a mounting device 1 mounted on a vehicle 10 and a monitoring center device 2 are connected via a communication network. The mounting device 1 may communicate and connect with the monitoring center device 2 using, for example, public wireless communication, and may communicate and connect with the monitoring center device 2 via a relay device by performing short-range wireless communication with the relay device wired-connected with the monitoring center device 2 installed at a roadside machine or a position close to a traveling road.

Figure 2:
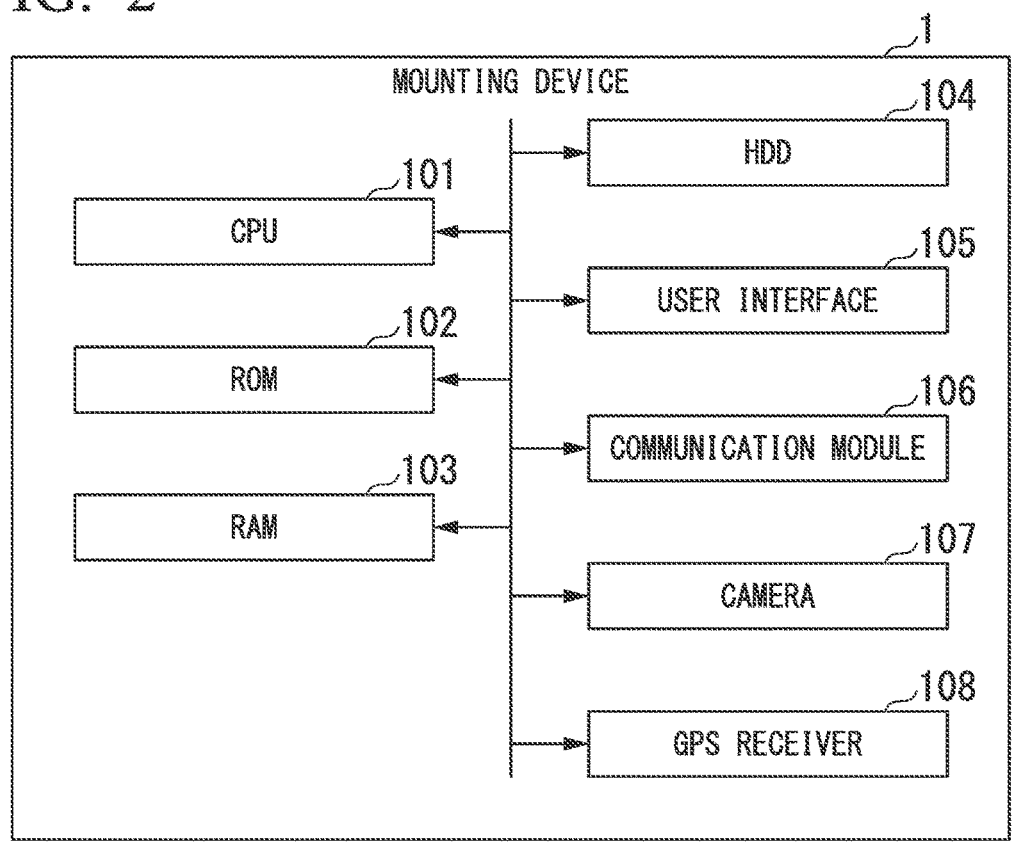
FIG. 2 is a hardware configuration diagram of a mounting device according to one embodiment of the present invention.

FIG. 2 is a hardware configuration diagram of the mounting device. As shown in FIG. 2, the mounting device 1 includes, for example, respective hardware constituents such as a central processing unit (CPU) 101, a read only memory (ROM) 102, a random access memory (RAM) 103, a hard disk drive (HDD) 104, a user interface 105, a communication module 106, a camera 107, a Global Positioning System (GPS) receiver 108, and the like. The user interface 105 is, for example, a liquid crystal touch panel or a button. The mounting device 1 may be configured to further include other hardware.

Figure 3:
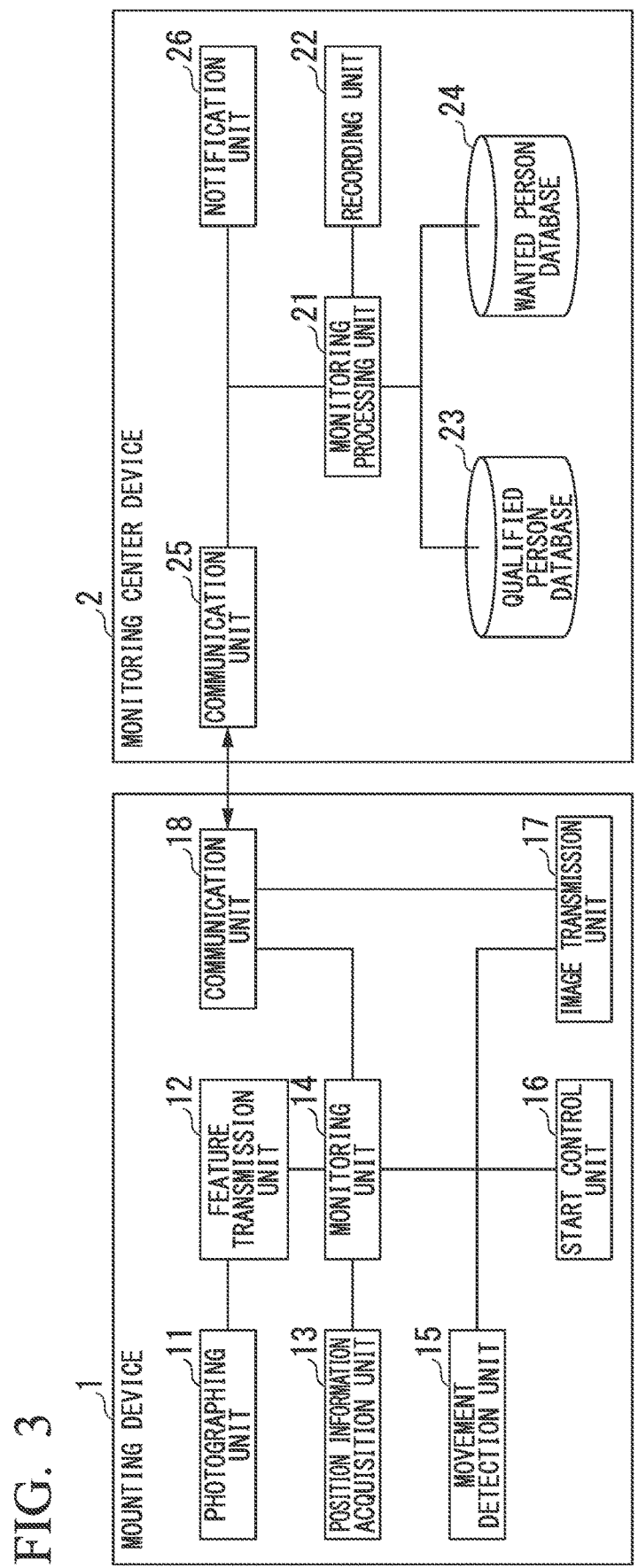
FIG. 3 is a functional block diagram of the mounting device and a monitoring center device according to one embodiment of the present invention.

FIG. 3 is a functional block diagram of the mounting device and the monitoring center device.

The mounting device executes a program stored in the ROM 102 or the like of the mounting device, thereby including each function of a photographing unit 11, a feature transmission unit 12, a position information acquisition unit 13, a monitoring unit 14, a movement detection unit 15, a start control unit 16, an image transmission unit 17, and a communication unit 18 therein.

The photographing unit 11 included in the mounting device 1 performs photographing by controlling the camera 107, and generates an image by this photographing. The photographing unit 11 is installed in a vehicle to photograph a face of a driver of the vehicle and the inside of the vehicle and can photograph moving images and still images.

The feature transmission unit 12 recognizes the face of the driver on the basis of the image photographed by the camera 107 and obtained by the photographing unit 11 and extracts feature data of a person. The feature data in the present embodiment is data including at least feature information on the face of the driver. The feature transmission unit 12 may extract feature data of the faces of passengers boarding the vehicle in addition to the driver. The feature transmission unit 12 transmits monitoring data including the feature data, position information of the vehicle 10 acquired by the position information acquisition unit 13, time measured by a timer in the mounting device 1 to the monitoring center device 2. When the feature data cannot be generated from an image, the feature transmission unit 12 may request the image transmission unit 17 to transmit the image, perform processing to alert the driver, or notify the monitoring unit 14 that the feature data cannot be generated.

The position information acquisition unit 13 calculates a current position of the vehicle 10 on the basis of information included in a signal from a satellite obtained from the GPS receiver 108.

The monitoring unit 14 transmits the feature data to a predetermined service device such as the monitoring center device 2. A service device in the present embodiment is the monitoring center device 2.

The movement detection unit 15 detects that the vehicle 10 has moved on the basis of acceleration and position information. The movement detection unit 15 may detect states of a vehicle such as a stopping state, a stopped state, and a traveling state. The movement detection unit 15 can transmit movement states (stopping, stopped, and traveling) of the vehicle 10.

The start control unit 16 acquires a determination result from the monitoring center device 2 according to the transmission of the feature data to the monitoring center device 2, and controls starting of a vehicle on which the mounting device 1 is mounted on the basis of the determination result. The start control unit 16, as an example, may perform control to start a vehicle when two conditions such as performance of a starting operation of a vehicle using an ignition switch or a key, and acquisition of starting permission by the monitoring unit 14 are satisfied.

The image transmission unit 17 performs processing of transmitting images acquired from the camera 107 by the photographing unit 11. The communication unit 18 communicates and connects with the monitoring center device 2.

The monitoring center device 2, like the mounting device 1, is a computer including hardware such as a CPU, a ROM, a RAM, an HDD, a user interface, and a communication module. The CPU of the monitoring center device 2 executes a program, and thereby the monitoring center device 2 includes each function of a monitoring processing unit 21, a recording unit 22, a communication unit 25, and a notification unit 26. In addition, the monitoring center device 2 includes a qualified person database 23 and a wanted person database 24.

The monitoring processing unit 21 in the monitoring center device 2 searches for the qualified person database 23 storing information on a driver's license possessed by a police institution or the like and the wanted person database 24 in which feature data of a wanted person such as a wanted criminal is recorded. The monitoring processing unit 21 collates feature data stored in these databases with feature data obtained from the mounting device 1 and determines whether they match each other. The monitoring processing unit 21 transmits a determination result of the collation to the mounting device 1.

The recording unit 22 stores monitoring data including feature data and the like of a person transmitted from the feature transmission unit 12 of the vehicle 10.

The qualified person database 23 holds data of a driver's license, data of a face photograph of a person on the driver's license, and personal feature data of the person.

The wanted person database 24 holds data of a face photograph of a wanted person such as a wanted criminal and other personal feature data.

The communication unit 25 is a processing unit which communicates and connects with the mounting device 1.

The notification unit 26 performs processing of notifying a predetermined transmission destination of an abnormality when it is determined that there is an abnormality on the basis of the feature data. The notification unit 26 may transfer the abnormality notification to the predetermined transmission destination on the basis of an abnormality notification signal from the mounting device 1.

The mounting device 1 and the monitoring center device 2 include such respective functions, and thereby it is possible to reliably monitor a driver of a vehicle and to accumulate monitoring information. Accordingly, this can help with investigations and search and rescue operations of police, firefighting, and the like when there are incidents, accidents, and disasters.

Figure 4:
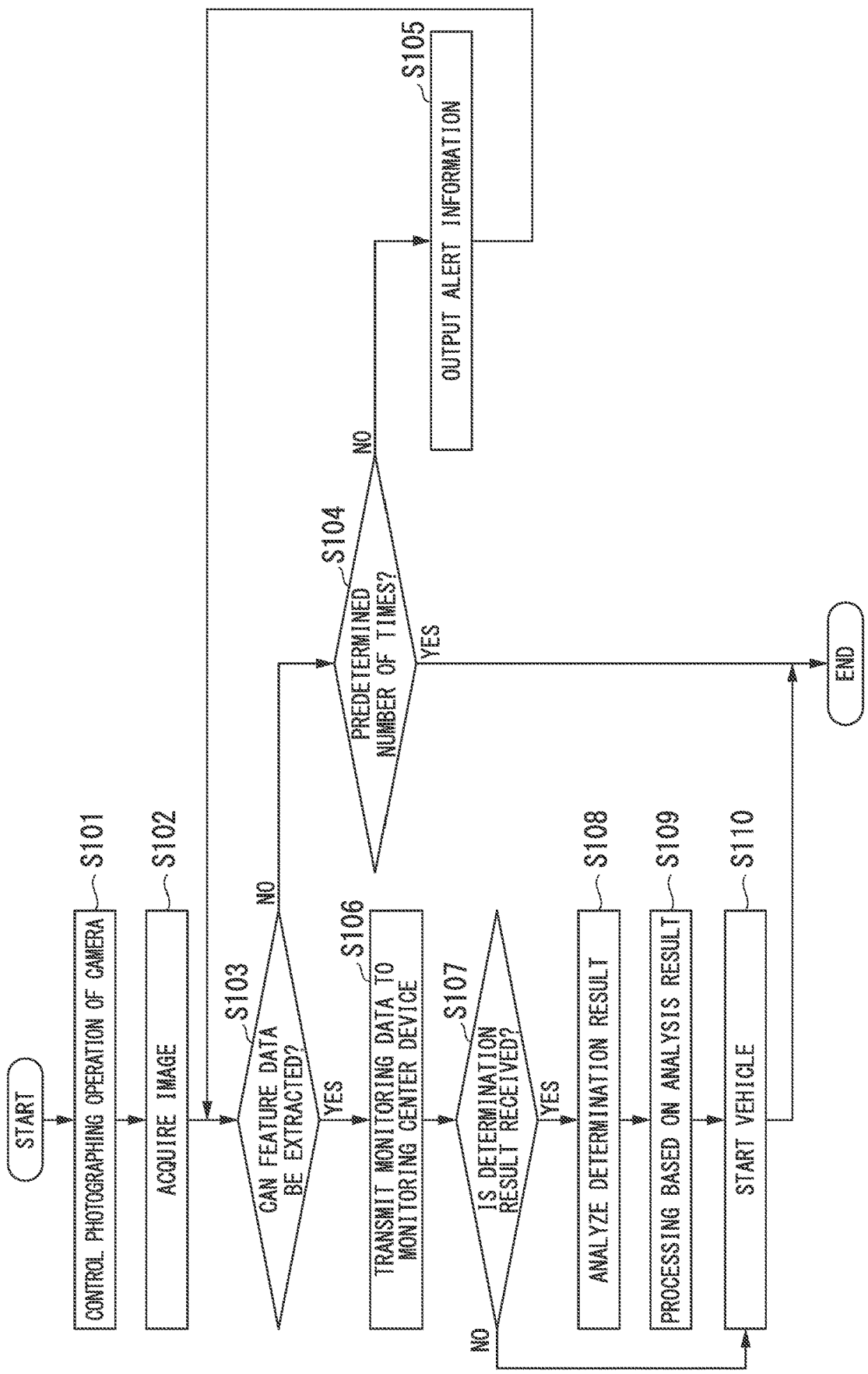
FIG. 4 is a first diagram which shows a processing flow of the mounting device according to one embodiment of the present invention.

FIG. 4 is a first diagram which shows a processing flow of the mounting device.

Next, processing of the embodiment of the present invention will be described in order.

First, a driver performs a staring operation of a vehicle using an ignition switch or a key in a cockpit to start the vehicle 10. The camera 107 is installed to photograph the face of the driver. The starting operation starts the mounting device 1. The photographing unit 11 controls a photographing operation of the camera 107 (step S101). Then, the camera 107 starts photographing and outputs photographed data to the photographing unit 11. This photographed data includes data of the face of the driver. The photographing unit 11 generates an image on the basis of the photographed data and output the image to the feature transmission unit 12.

The feature transmission unit 12 acquires images (step S102). The feature transmission unit 12 determines whether feature data of the face of the driver has been extracted from the image (step S103). The feature transmission unit 12 determines whether the number of times it is determined that the feature data of the face of the driver cannot be extracted reaches a predetermined number (step S104). The feature transmission unit 12 outputs alert information when No is determined in step S104 (step S105). A case of outputting alert information is a case in which feature data cannot be extracted when the driver's posture is bad or when the driver wears a mask or sunglasses. In addition, the alert information is information prompting the driver to enable personal feature data to be extracted, and is output by screen display, voice, and the like. If Yes is determined in step S104, the feature transmission unit 12 cannot recognize a face image or cannot extract the feature data. For this reason, the feature transmission unit 12 transmits the inability to extract the feature data to the monitoring center device 2.

If the feature data has been extracted, the feature transmission unit 12 instructs the monitoring unit 14 to transmit the feature data. The monitoring unit 14 acquires information on a current position of the vehicle 10 from the position information acquisition unit 13. The monitoring unit 14 acquires a current time. The monitoring unit 14 transmits monitoring data including at least the feature data, position information, and the current time to the monitoring center device 2 via the communication unit 18 (step S106). The monitoring unit 14 determines whether monitoring data has been transmitted. The monitoring unit 14 outputs a signal indicating that monitoring data cannot be transmitted to the start control unit 16 when monitoring data cannot be transmitted.

The monitoring unit 14 determines whether a determination result based on transmission of monitoring data is received from the monitoring center device 2 (step S107). The determination result includes various information such as a qualified person flag, a wanted person flag, a still image transmission flag, and a moving image transmission flag. The qualified person flag is a flag indicating whether a person corresponding to the feature data has a qualification. The wanted person flag is a flag indicating whether a person corresponding to the feature data is a wanted person. The still image transmission flag is a flag indicating whether it is necessary to transmit a still image. The moving image transmission flag is a flag indicating whether it is necessary to transmit a moving image. When Yes is determined in step S107, the monitoring unit 14 analyzes the determination result (step S108).

The monitoring unit 14 analyzes the qualified person flag in analysis processing. In addition, the monitoring unit 14 analyzes the wanted person flag in the analysis processing. In addition, the monitoring unit 14 analyzes the still image transmission flag in the analysis processing. In addition, the monitoring unit 14 analyzes the moving image transmission flag in the analysis processing. The monitoring unit 14 performs processing based on a result of the analysis (step S109).

Specifically, the monitoring unit 14 output starting permission to the start control unit 16 when it is determined that the qualified person flag indicates that a person has the qualification. The monitoring unit 14 may not output starting permission to the start control unit 16 when it is determined that a qualified person flag indicates that the person does not have the qualification.

When the still image flag is a value indicating that it is necessary to transmit the still image, the monitoring unit 14 instructs the image transmission unit 17 to transmit the still image. When the moving image transmission flag is a value indicating that it is necessary to transmit the moving image, the monitoring unit 14 instructs the image transmission unit 17 to transmit the moving image. The image transmission unit 17 sequentially inputs images from the photographing unit 11. The photographing unit 11 generates the moving image on the basis of a plurality of images acquired from the camera 107 and transmits the moving image to the image transmission unit 17. The image transmission unit 17 transmits the moving image to the monitoring center device 2 via the communication unit 18 when a transmission instruction of the moving image is acquired. The image transmission unit 17 transmits one still image in images constituting the moving image to the monitoring center device 2 via the communication unit 18 when a transmission instruction of the still image is acquired.

After the moving image or the still image is transmitted in accordance with a determination result from the monitoring center device 2, the mounting device 1 receives a monitoring completion signal from the monitoring center device 2. The monitoring completion signal is acquired by the monitoring unit 14. If the monitoring unit 14 acquires the monitoring completion signal, the monitoring unit 14 outputs starting permission to the start control unit 16. The start control unit 16 outputs a signal for starting a vehicle to an engine control device when two conditions such as performance of a starting operation of a vehicle using an ignition switch or a key and acquisition of starting permission by the monitoring unit 14 are satisfied (step S110). This starts an engine of the vehicle 10.

As described above, the vehicle 10 can be started when a starting operation of a vehicle using an ignition switch and a key and monitoring are performed. Accordingly, it is possible to reliably monitor the driver when the vehicle 10 starts.

When communication between the mounting device 1 and the monitoring center device 2 cannot be performed for any reason, the monitoring unit 14 may temporarily store the still image and the moving image without transmitting them to the monitoring center device 2 on the basis of a determination result obtained from the monitoring processing unit 21. In this case, the monitoring unit 14 may output starting permission of the vehicle 10 to the start control unit 16 without acquiring a monitoring completion signal from the monitoring center device 2. The monitoring unit 14 can send the still image and the moving image temporarily stored after the communication between the monitoring center device 2 and the mounting device 1 is restored.

While the vehicle 10 moves, the monitoring unit 14 performs monitoring processing again if the operation of the vehicle 10 continues for a certain period of time. A monitoring processing procedure is the same as the processing shown in FIG. 4. The monitoring unit 14 may not perform monitoring processing when it is determined that the vehicle 10 is started but not moving. Accordingly, it is possible to reliably monitor the driver even when the vehicle 10 is in operation.

Figure 5:
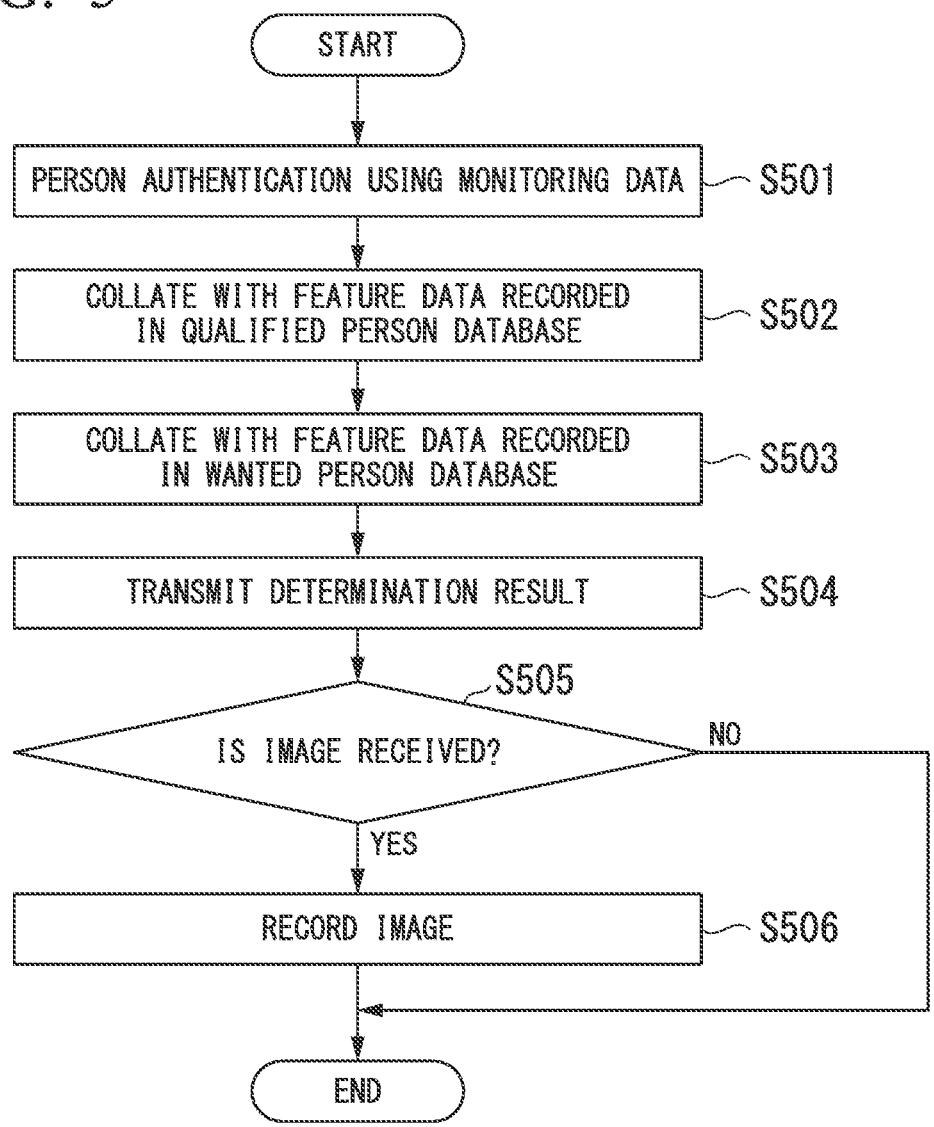
FIG. 5 is a diagram which shows a processing flow of the monitoring center device according to one embodiment of the present invention.

FIG. 5 is a diagram which shows a processing flow of the monitoring center device.

The monitoring processing unit 21 of the monitoring center device 2 performs person authentication using monitoring data transmitted by the mounting device 1 (step S501). The monitoring processing unit 21 collates feature data extracted from the monitoring data with feature data recorded in the qualified person database 23 (step S502). When matching feature data is detected in the collation processing of step S502, the monitoring processing unit 21 stores the feature data and sets the qualified person flag to a value indicating that a person has a qualification.

In addition, the monitoring processing unit 21 collates the feature data extracted from the monitoring data with feature data recorded in the wanted person database 24 (step S503). When matching feature data is detected in the collation processing of step S503, the monitoring processing unit 21 stores the feature data and sets the wanted person flag to a value indicating that a person is the wanted person.

If the wanted person flag is set to the value indicating that the person is the wanted person, the monitoring processing unit 21 sets the still image flag to a value indicating that it is necessary to transmit the still image or sets the moving image flag to a value indicating that it is necessary to transmit the moving image. The monitoring processing unit 21 transmits a determination result holding various types of flags to the mounting device 1 (step S504).

When the qualified person flag included in the determination result is a value indicating that the person is not the qualified person, and the wanted person flag included in the determination result is a value indicating that the person is not the wanted person, this indicates that no feature data is recorded in both the qualified person database 23 and the wanted person database 24. In this case, the feature data providing this determination result is feature data not held in the monitoring center device 2, and the monitoring unit 14 of the mounting device 1 transmits the still image to the monitoring center device 2. The monitoring processing unit 21 of the monitoring center device 2 determines whether a still image is received (step S505). When the still image is received, the monitoring processing unit 21 outputs a face image and the feature data corresponding to the face image to the recording unit 22. The recording unit 22 records the face image and the feature data corresponding to the face image in a database (step S506). As a result, monitoring data is stored. As described above, the monitoring unit 14 is requested to add the feature data to be monitored and the face image. The monitoring center device 2 can reliably monitor a driver and further store the monitoring data.

The monitoring processing unit 21 of the monitoring center device 2 determines that it is an emergency when the inability to extract feature data is acquired by the mounting device 1 or when feature data included in monitoring data is stored in the wanted person database 24. When the feature data cannot be extracted, there is a possibility that a driver maliciously refuses monitoring and authentication, and the monitoring processing unit 21 can transmit an instruction to strengthen monitoring to the mounting device 1. The monitoring unit 14 of the mounting device 1 may instruct the image transmission unit 17 to deliver a moving image when information to strengthen monitoring is received. Accordingly, the monitoring center device 2 can perform real-time monitoring. In addition, when the inability to extract the feature data is received by the monitoring processing unit 21, the notification unit 26 of the monitoring center device 2 may transmit notification information including the face image and the feature data to a device at a predetermined report destination.

By performing such monitoring of a driver, it is possible to expect a crime suppression effect such as hesitation of a crime by a person who drives. When it can be confirmed by notification information that a person is a wanted person, it is possible to contribute to the arrests of wanted persons by notifying an investigation institution and strengthening monitoring on the vehicle 10 as described above.

In addition, when feature data is recorded in the qualified person database 23 by collation processing, the monitoring processing unit 21 may record information such as suspension of a driver's license, license invalidation, and an unauthorized vehicle in correlation with the qualified person information of the qualified person database 23. With this processing, it is possible to detect an obvious driving violation. In this manner, this processing can be used in catching a violation.

The monitoring center device 2 can ascertain a situation in which a driver is a learner on a temporary license, a foreigner who drives a rental car, or the like when feature information is not recorded in any database according to a result of performing collation processing using two databases of the qualified person database 23 and the wanted person database 24. In this case, the monitoring center device 2 can request not only the feature data of a driver but also the face image of the driver to the mounting device 1, and store and monitor monitoring data including the face image.

By constructing a monitoring system with the mounting device 1 and the monitoring center device 2, it is possible to expect an effect of crime prevention. In addition, monitoring data such as face images and stored feature data can be searched by a person and person feature information, and this can help with tracking, investigating, and searching for and rescuing persons of interest. Therefore, it is possible to detect and prevent various types of crimes in addition to theft in a moving body such as various vehicles.

The monitoring unit 14 of the mounting device 1 may permit starting of the vehicle 10 even in a situation in which communication with the monitoring center device 2 is not possible. In addition, the monitoring unit 14 may request the feature transmission unit 12 to transmit personal feature data when the vehicle 10 continuously runs for a certain distance or more on the basis of state information of the vehicle 10. Moreover, when notification that the feature transmission unit 12 cannot extract personal feature data is continuous, it is possible to determine that it is an emergency, and it is possible to notify the monitoring center device 2 that it is an emergency.

When feature data of a driver is recorded in the wanted person database 24, the notification unit 26 can notify a predetermined device to that effect as an emergency. In addition, the monitoring processing unit 21 can instruct monitoring strengthening such as continuous photographing and transmission of moving images and transmission of still images to the mounting device 1. For example, when feature data of a driver is recorded in the qualified person database 23 and the feature data of the driver is recorded in the qualified person database 23 in accordance with information on license suspension, the monitoring processing unit 21 can notify a device possessed by a predetermined institution to that effect via the notification unit 26.

In addition, the monitoring processing unit 21 can instruct the monitoring unit 14 to strengthen monitoring such as transmission of still images. For example, when the monitoring processing unit 21 is notified that it is an emergency by the mounting device 1, the monitoring processing unit 21 can notify a predetermined device to that effect via the notification unit 26. Moreover, the monitoring processing unit 21 can instruct the monitoring unit 14 to strengthen monitoring such as transmission of still images.

Figure 6:
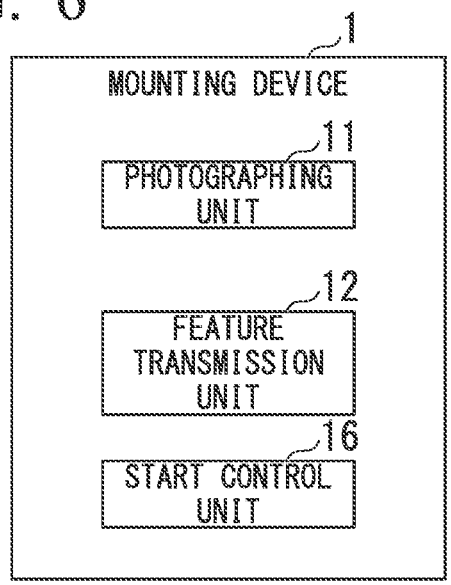
FIG. 6 is a diagram which shows a minimum configuration of the mounting device according to one embodiment of the present invention.

FIG. 6 is a diagram which shows a minimum configuration of the mounting device.

The mounting device 1 as shown in FIG. 6 may be a device including at least a photographing unit 11, a feature transmission unit 12, and a start control unit 16.

Figure 7:
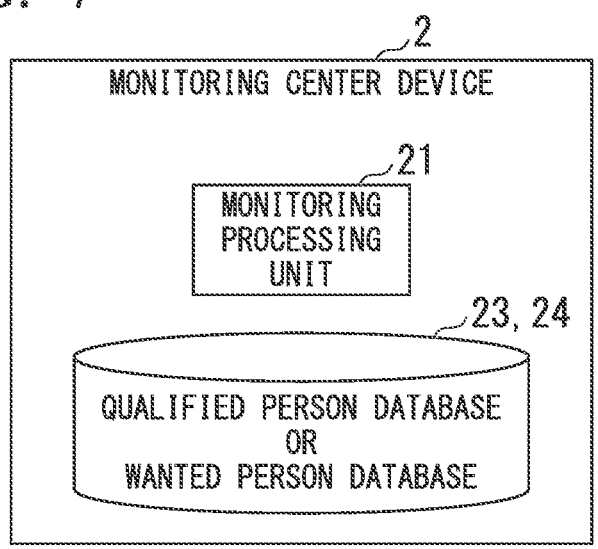
FIG. 7 is a diagram which shows a minimum configuration of the monitoring center device according to one embodiment of the present invention.

FIG. 7 is a diagram which shows a minimum configuration of the monitoring center device.

The monitoring center device 2 as shown in FIG. 7 at least includes a monitoring processing unit 21 which determines whether feature data received from the mounting device 1 is recorded in a database, and performs monitoring processing on the basis of a result of the determination.

The whole or part of the example embodiments disclosed above can be described as, but not limited to, the following supplementary notes.

Supplementary not (Supplementary Note 1)

In a monitoring system comprising a mounting device of a moving body and a monitoring center device connected to the mounting device via a communication network, the mounting device includes a photographing unit configured to photograph a passenger, and a feature transmission unit configured to transmit feature data of the passenger, and the monitoring center device includes a monitoring processing unit configured to determine whether the feature data is recorded in a database and to perform monitoring processing on the basis of a result of the determination.

(Supplementary Note 2)

The monitoring system according to Supplementary note 1 in which the monitoring processing unit transmits a determination result to the mounting device on the basis of the determination result, and the mounting device includes a start control unit which controls starting of a moving body on which the mounting device is mounted on the basis of the determination result.

(Supplementary Note 3)

The monitoring system according to Supplementary note 1 or Supplementary note 2, in which the monitoring center device includes a recording unit for recording the feature data.

(Supplementary Note 4)

The monitoring system according to Supplementary note 3, in which the feature transmission unit transmits a time at which the feature data is extracted from an image generated by photographing the passenger and position information of the moving body together with the feature data to the monitoring center device, and the recording unit records the feature data, the time, and the position information in correlation with each other.

(Supplementary Note 5)

The monitoring system according to any one of Supplementary note 1 to Supplementary note 4, in which the mounting device includes a movement detection unit for detecting a movement of the moving body, and the feature transmission unit transmits the feature data to the monitoring center device on the basis of detection of a movement of the movement detection unit.

(Supplementary Note 6)

The monitoring system according to any one of Supplementary note 1 to Supplementary note 5, in which the monitoring processing unit of the monitoring center device determines whether there is an abnormality in the monitoring processing on the basis of the determination result, and the monitoring center device further includes a notification unit for, when it is determined that there is an abnormality, notifying a predetermined transmission destination of the abnormality.

(Supplementary Note 7)

The monitoring system according to Supplementary note 4, in which the monitoring processing unit of the monitoring center device requests the mounting device to continuously transmit the feature data, the time, and the position information when it is determined that there is an abnormality in the monitoring processing on the basis of a result of the determination.

(Supplementary Note 8)

A monitoring center device in a monitoring system in which a mounting device of a moving body including a photographing unit for photographing a passenger and a feature transmission unit for transmitting feature data of the passenger and the monitoring center device are connected via a communication network includes a monitoring processing unit which determines whether the feature data is recorded in a database and performs monitoring processing on the basis of a result of the determination.

(Supplementary Note 9)

A mounting device in a monitoring system in which a mounting device of a moving body and a monitoring center device are connected via a communication network includes a photographing unit configured to photograph a passenger, a feature transmission unit configured to transmit feature data of the passenger to the monitoring center device, and a start control unit configured to acquire, from the monitoring center device which performs monitoring processing on the basis of a result of determining whether the feature data is recorded in a database, a result of the determination, and to control starting of a moving body on which the mounting device is mounted on the basis of the result of the determination.

(Supplementary Note 10)

A monitoring method includes determining whether the feature data is recorded in a database and performing monitoring processing on the basis of a result of the determination, by a monitoring center device in a monitoring system in which a mounting device of a moving body including a photographing unit for photographing a passenger and a feature transmission unit for transmitting feature data of the passenger and the monitoring center device are connected via a communication network.

(Supplementary Note 11)

A processing method includes, by a mounting device in a monitoring system in which the mounting device of a moving body and a monitoring center device are connected via a communication network, photographing a passenger, transmitting feature data of the passenger to the monitoring center device, and acquiring, from the monitoring center device for performing monitoring processing on the basis of a result of determining whether the feature data is recorded in a database, a result of the determination and controlling starting of a moving body on which the mounting device is mounted on the basis of the result of the Determination.

(Supplementary Note 12)

A non-transitory computer-readable recording medium storing a program which causes a computer to perform processes of a monitoring center device in a monitoring system in which a mounting device of a moving body including a photographing unit for photographing a passenger and a feature transmission unit for transmitting feature data of the passenger and a monitoring center device are connected via a communication network, the processes comprising determining whether or not the feature data is recorded in a database and to perform monitoring processing on the basis of a result of the determination.

(Supplementary Note 13)

A non-transitory computer-readable recording medium storing a program which causes a computer to perform processes of a mounting device in a monitoring system in which the mounting device of a moving body and a monitoring center device are connected via a communication network, the processes comprising photographing a passenger, transmitting feature data of the passenger to the monitoring center device, and acquiring, from the monitoring center device performing monitoring processing on the basis of a result of determining whether the feature data is recorded in a database, a result of the determination, and controlling starting of a moving body on which the mounting device is mounted on the basis of the result of the determination.

The mounting device 1 described above has a computer system inside. A program for causing each device to perform the processing described above is stored in a computer readable recording medium of each of these devices and a computer of each device reads and executes this program to perform the processing described above. Here, the computer readable recording medium refers to a magnetic disk, a magneto-optical disc, a CD-ROM, a DVD-ROM, a semiconductor memory, and the like. In addition, this computer program may be delivered to a computer via a communication line, and the computer receiving this delivery may execute the program.

In addition, the program may realize some of functions of respective processing units described above. Further, the program may be a so-called difference file (difference program) which can realize the functions described above in combination with a program already recorded in a computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A monitoring system comprising:
   a mounting device of a moving body; and
   a monitoring center device connected to the mounting device via a communication network, wherein
   the mounting device is configured to:
      execute photographing a passenger of the moving body;
      perform extraction processing for extracting feature data including feature information of a face of the passenger, from an image of the passenger generated by the photographing;
      transmit, when the extracting processing of the feature data of the passenger is succeeded, the extracted feature data to the monitoring center device;
      transmit, when a count of extraction failure times of failure in the extracting processing of the feature data used for matching processing of the passenger in the monitoring center device reaches a predetermined number, failure information indicating that the extracting processing of the feature data is failed to the monitoring center device, and
   the monitoring center device is configured to perform, when the monitoring center device receives the failure information, at least either one of:
      instructing the mounting device to strengthen monitoring; and
      transmitting notification information to a predetermined destination device.

2. The monitoring system according to claim 1, wherein the mounting device is configured to perform the extraction processing for extracting the feature data of the face of the passenger boarding the moving body other than a driver.

3. The monitoring system according to claim 1, wherein the monitoring center device is configured to perform instructing the mounting device to transmit the image of the passenger or to alert a driver.

4. The monitoring system according to claim 1,
   wherein the monitoring center device includes a recording unit for recording the feature data,
   the mounting device is configured to transmit a time at which the feature data is extracted from the image of the passenger generated by the photographing and position information of the moving body together with the feature data to the monitoring center device, and
   the recording unit of the monitoring center device is configured to record the feature data, the time, and the position information in correlation with each other.

5. The monitoring system according to claim 1,
   wherein the mounting device is configured to store a still image or moving image without transmitting to the monitoring center device, when a communication between the monitoring center device and the mounting device is impossible,
   the monitoring center device is configured to output a starting permission of the moving body, and
   the mounting device is configured to transmit the stored still image or the stored moving image after the communication between the monitoring center device and the mounting device is restored to being communicable.

6. A monitoring method comprising:
executing, by a mounting device of a moving body, photographing a passenger of the moving body;
performing, by the mounting device, extraction processing for extracting feature data including feature information of a face of the passenger, from an image of the passenger generated by the photographing;
transmitting, by the mounting device, when the extracting processing of the feature data of the passenger is succeeded, the extracted feature data to the monitoring center device that is connected to the mounting device via a communication network;
transmitting, by the mounting device, when a count of extraction failure times of failure in the extracting processing of the feature data used for matching processing of the passenger in the monitoring center device reaches a predetermined number, failure information indicating that the extracting processing of the feature data is failed to the monitoring center device, and
performing, by the monitoring center device, when the monitoring center device receives the failure information, at least either one of:
instructing the mounting device to strengthen monitoring; and
transmitting notification information to a predetermined destination device.

7. The monitoring method according to claim 6, wherein in the performing the extraction processing, the extraction processing for extracting the feature data of the face of the passenger boarding the moving body other than a driver is performed.

8. The monitoring method according to claim 6, wherein in the performing the instructing, the instructing the mounting device to transmit the image of the passenger or to alert a driver is performed.

9. The monitoring method according to claim 6, further comprising:
transmitting, by the mounting device, a time at which the feature data is extracted from the image of the passenger generated by the photographing and position information of the moving body together with the feature data to the monitoring center device; and
recording, by the monitoring center device, the feature data, the time, and the position information in correlation with each other.

10. The monitoring method according to claim 6, further comprising:
storing, by the mounting device, a still image or moving image without transmitting to the monitoring center device, when a communication between the monitoring center device and the mounting device is impossible;
outputting, by the monitoring center device, a starting permission of the moving body; and
transmitting, by the mounting device, the stored still image or the stored moving image after the communication between the monitoring center device and the mounting device is restored to being communicable.

11. A non-transitory computer-readable recording medium storing a program that causes a computer to perform processes of a mounting device in a monitoring system in which the mounting device of a moving body and a monitoring center device are connected via a communication network, the processes comprising:
executing photographing a passenger of the moving body;
performing extraction processing for extracting feature data including feature information of a face of the passenger, from an image of the passenger generated by the photographing;
transmitting when the extracting processing of the feature data of the passenger is succeeded, the extracted feature data to the monitoring center device; and
transmitting, when a count of extraction failure times of failure in the extracting processing of the feature data used for matching processing of the passenger in the monitoring center device reaches a predetermined number, failure information indicating that the extracting processing of the feature data is failed to the monitoring center device,
wherein, when the failure information is received by the monitoring center device, at least either one of instructing the mounting device to strengthen monitoring and transmitting notification information to a predetermined destination device is performed by the monitoring center device.

12. The non-transitory computer-readable recording medium according to claim 11, wherein in the performing the extraction processing, the extraction processing for extracting the feature data of the face of the passenger boarding the moving body other than a driver is performed.

13. The non-transitory computer-readable recording medium according to claim 11, wherein the processes further comprising:
transmitting the image of the passenger or alerting a driver in response to receiving the instructing by the monitoring center device.

14. The non-transitory computer-readable recording medium according to claim 11, wherein the processes further comprising:
transmitting a time at which the feature data is extracted from the image of the passenger generated by the photographing and position information of the moving body together with the feature data to the monitoring center device;
the feature data, the time, and the position information are recorded in correlation with each other by the monitoring center device.

15. The non-transitory computer-readable recording medium according to claim 11, wherein the processes further comprising:
storing a still image or moving image without transmitting to the monitoring center device, when a communication between the monitoring center device and the mounting device is impossible;
receiving, from the monitoring center device, a starting permission of the moving body; and
transmitting the stored still image or the stored moving image after the communication between the monitoring center device and the mounting device is restored to being communicable.

16. The monitoring system according to claim 1, wherein the mounting device is configured to:
determine if the count of the extraction failure times reaches the predetermined number;
causing the mounting device to output information prompting the passenger to take action with until the count of the extraction failure times reaches the predetermined number, and transmit the failure information to the monitoring center device when the count of the extraction failure times reaches the predetermined number, and the monitoring center device is configured to perform, when the monitoring center device receives the failure information indicating that the extracting processing of the feature data is failed, at least either one of:
  instructing the mounting device to strengthen monitoring; and
  transmitting the notification information to the predetermined destination device.

17. The monitoring system according to claim 1, wherein the mounting device is configured to:
  perform the extraction processing for extracting the feature data including the feature information of the face of the passengers which include the passenger other than a driver in addition to the driver among passengers boarding the moving body; and
  transmit, when the count of the extraction failure times of the failure in the extracting processing of the feature data used for the matching processing of the passengers which include the passenger other than the driver in addition to the driver, reaches the predetermined number, the failure information to the monitoring center device.

18. The monitoring system according to claim 17, wherein the monitoring center device is configured to perform, when the monitoring center device receives the failure information, at least either one of:
  instructing the mounting device to transmit the image of the passenger other than the driver in addition to the image of the driver; and
  transmitting the notification information to the predetermined destination device.

* * * * *